Patented Dec. 11, 1945

2,390,609

UNITED STATES PATENT OFFICE 2,390,609

BODYING AGENT FOR LIQUID HYDROCARBONS

Arthur Minich, Mountainside, N. J., assignor to Nuodex Products Co., Inc., Elizabeth, N. J., a corporation of New York No Drawing. Application July 29, 1942, Serial No. 452,758

1 Claim. (Cl. 252—316)

This invention is directed to the production of a bodying agent for increasing the viscosity of liquid hydrocarbons and more especially liquid hydrocarbon fuels. The invention is particularly useful in forming such liquid hydrocarbons into gels. It has been employed with complete satisfaction in forming gels from hydrocarbons throughout the range of the heavier hydrocarbons, such as high viscosity oils, including lubricating oils to the lighter hydrocarbons, such as mineral spirits and like light naphthas.

Speaking generally, the bodying agent of this invention comprises a reaction product of an aqueous solution of an alkali soap of naphthenic acid and at least one mono basic fatty acid, selected from the group consisting of oleic acid, cocoanut fatty acids, capric acid, hydrogenated rosin, synthetic fatty acid, and 2-ethylhexoic acid, carrying free and unreacted hydroxide, with an aqueous solution of a water-soluble aluminum salt in sufficient quantity to react the alkali soap and the other alkali hydroxide, so that the end product bodying agent constituents a hydroxy aluminum soap.

The method by means of which this soap is produced is of the double decomposition type. By way of example, I have practised the method of this invention as follows:

EXAMPLE 1

Solution A 70 pounds of flake caustic soda was dissolved in 260 gallons of water, then while agitating this solution, there was added 66 pounds of naphthenic acid, 232 pounds of cocoanut fatty acids, and 66 pounds of oleic acid. As a result I obtained a solution of a sodium soap of the foregoing acids and free unreacted alkali hydroxide, i. e., free sodium hydroxide.

Solution B

In a separate container I dissolved 198 pounds of aluminum sulphate crystals in 25 gallons of water.

I then slowly ran Solution B into Solution A while the latter was agitated and I continued agitation between one-half hour to one hour to complete reaction and form therefrom a magma consisting of a water-insoluble hydroxy aluminum soap of the foregoing acids and water and by-product salts. I allowed this to settle and thereafter separated by washing or filtration or by both. The product when dried was a granulated material which could be readily powdered.

EXAMPLE 2

Solution A

To 116 pounds of 25% caustic soda solution in water were added 500 pounds of water, under agitation, and 50 pounds of synthetic fatty acid of 300–320 acid number, and 50 pounds of naphthenic acid.

Solution B 81 pounds of aluminum sulphate crystals were put in solution in 300 pounds of water.

Solution B was then run into Solution A while agitated and agitation was continued to complete reaction to form a magma of water-insoluble hydroxy aluminum soap of the said acids and water and by-product salts. These were allowed to settle, as in Example 1, and the product was dried to form a granular hydroxy end product.

EXAMPLE 3

Solution A

|  | Grams |
|---|---|
| 25% caustic soda solution in water | 124 |
| Water | 600 |
| 2-ethylhexoic acid | 50 |
| Naphthenic acid | 50 |

Solution B 86.5 grams aluminum sulphate in 400 grams water.

Solutions A and B were reacted as in Examples 1 and 2 and dried to produce granular water-insoluble hydroxy aluminum soap of 2-ethylhexoic acid and naphthenic acid.

EXAMPLE 4

Solution A

|  | Grams |
|---|---|
| 25% caustic soda solution in water | 82½ |
| Water | 700 |
| Hydrogenated rosin | 25 |
| Naphthenic acid | 25 |
| Oleic acid | 50 |

*Solution B*

57¼ grams of aluminum sulphate in 300 grams of water.

Solutions A and B were reacted as in Example 1 to produce dry granular hydroxy aluminum soap of the said three acids.

EXAMPLE 5

*Solution A*

| | Grams |
|---|---|
| 25% caustic soda solution in water | 100 |
| Water | 500 |
| Oleic acid | 25 |
| Stearic acid | 10 |
| Cocoanut fatty acid | 40 |
| Naphthenic acid | 25 |

*Solution B*

69 grams of aluminum sulphate dissolved in 360 grams of water.

Solutions A and B were reacted as in Example 1 to yield dry granular hydroxy aluminum soap of the same acids.

EXAMPLE 6

*Solution A*

| | Grams |
|---|---|
| 50% caustic soda solution in water | 500 |
| Water | 4,000 |
| Capric acid | 400 |
| Naphthenic acid | 600 |

*Solution B*

780 grams of aluminum sulphate solution in 3000 grams of water.

Solutions A and B were reacted as in Example 1 to produce granular hydroxy aluminum soap of the foregoing acids.

In using the bodying agents produced according to the foregoing examples, I add a quantity of the agent to the hydrocarbon liquid to be treated, while the liquid is agitated and I continue agitation from 20 minutes to one hour, to effect solvation. This action may be facilitated by heating the liquid, but when this heating is used, the temperature should be below the decomposition temperature of the hydroxide. In practice the heating may be conveniently around 200° F. The amounts of the various acids in Solution A are not critical. They have been varied within considerable ranges without producing inoperative results, but the proportions given have been found to be highly satisfactory. Furthermore the amount of the granular bodying agent added to the liquid hydrocarbons to gel or body the same will of course depend upon the viscosity increase desired for it will take less of the material to body a normally heavy high viscosity liquid than one of lower viscosity. The amount of the bodying material used therefore will be chosen according to the increase in viscosity desired therein. I have used to advantage between 1 and 15% by weight under various conditions with complete satisfaction.

An important feature of the invention consists in producing and employing a hydroxy aluminum salt of a mixture or blend of naphthenic acid with suitable fatty acids which latter are of such nature that the resulting hydroxy aluminum soap when in granular or powdered form will not decompose upon exposure to air or seriously oxidize and will carry out its bodying action efficiently. All fatty acids will not conform with these requirements, but I have found that a mixture of naphthenic acid with one or more of the mono basic fatty acids, hereinbefore specifically referred to will give very superior results.

I am of course aware that aluminum soaps of naphthenic acid have heretofore been used as bodying agents, but a hydroxy aluminum soap formed from a mixture of naphthenic acid with the mono basic fatty acids of the group to which I have referred gives very superior results.

The foregoing detailed description sets forth the invention in its preferred practical form, but the invention is to be understood as fully commensurate with the appended claim.

Having thus fully described the invention, what I claim as new and desire to secure by Letters Patent is:

As a bodying agent for liquid hydrocarbons, a homogeneous multiple hydroxy aluminum soap of a mixture of organic acids comprising naphthenic, oleic and cocoanut acids, said acids being in the ratio of approximately 25 parts naphthenic acid, 25 parts oleic acid and at least 40 parts of cocoanut acid, based on 100 parts of the acid mixture.

ARTHUR MINICH.